(12) United States Patent  
Krishnan et al.

(10) Patent No.: US 8,442,192 B2  
(45) Date of Patent: May 14, 2013

(54) CONNECTING WIRELESS, WIRELINE, AND INTERNET-PROTOCOL TERMINALS

(75) Inventors: Parameshwaran Krishnan, Basking Ridge, NJ (US); Jay M. Stiles, Watchung, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1206 days.

(21) Appl. No.: 12/197,858

(22) Filed: Aug. 25, 2008

(65) Prior Publication Data

US 2009/0274282 A1 Nov. 5, 2009

Related U.S. Application Data

(60) Provisional application No. 61/048,999, filed on Apr. 30, 2008.

(51) Int. Cl.
*H04M 11/00* (2006.01)

(52) U.S. Cl.
USPC ..................... 379/93.07; 379/90.01

(58) Field of Classification Search ............... 379/93.07, 379/90.01; 370/352
See application file for complete search history.

(56) References Cited

U.S. PATENT DOCUMENTS 6,404,764 B1 * 6/2002 Jones et al. .................... 370/352
2001/0030950 A1 * 10/2001 Chen et al. .................... 370/352

* cited by examiner

*Primary Examiner* — Stella Woo
(74) *Attorney, Agent, or Firm* — Maldjian Law Group LLC; John P. Maldjian, Esq.; Alexander D. Walter, Esq.

(57) ABSTRACT

An appliance for use at home or a business is disclosed that is inserted between the Public Switched Telephone Network and wireline terminal(s) in the home or business. The appliance also connects to the Internet and has a wireless transceiver for communicating with wireless terminals via radio. The appliance enables a user of a wireless terminal in the vicinity of the appliance to answer and conduct telephone calls on the wireline terminal(s) in the home or business. Furthermore, the appliance enables a user of the wireline terminal(s) in the home or business to initiate and conduct telephone calls through the wireless terminal. Furthermore, the appliance enables a user of the wireline terminal(s) in the home or business to answer, initiate, and conduct telephone calls through the Public Switched Telephone Network and the Internet.

20 Claims, 8 Drawing Sheets

CONNECTING WIRELESS, WIRELINE, AND INTERNET-PROTOCOL TERMINALS

FIELD OF THE INVENTION

The present invention relates to telecommunications in general, and, more particularly, to the cooperation of wireless terminals, wireline terminals and Internet-Protocol terminals.

BACKGROUND OF THE INVENTION

Wireless terminals (e.g., cell phones, Personal digital assistants, pagers, etc.), wireline terminals (e.g., wired and cordless home telephones, office telephones, etc.), and Internet-Protocol terminals are all common and provide similar services, but the need exists for more cooperation between them.

SUMMARY OF THE INVENTION

The present invention enables the cooperation of wireless terminals, wireline terminals, and Internet Protocol terminals without some of the costs and disadvantages of similar techniques in the prior art. For example, the illustrative embodiment of the present invention is an appliance for use at home or a business that is inserted between the Public Switched Telephone Network and wireline terminal(s) in the home or business. The appliance also connects to the Internet and has a wireless transceiver for communicating with wireless terminals via radio.

The appliance enables a user of a wireless terminal in the vicinity of the appliance to answer and conduct telephone calls on the wireline terminal(s) in the home or business. Furthermore, the appliance enables a user of the wireline terminal(s) in the home or business to initiate and conduct telephone calls through the wireless terminal. Furthermore, the appliance enables a user of the wireline terminal(s) in the home or business to answer, initiate, and conduct telephone calls through the Public Switched Telephone Network and the Internet. In this way, the appliance substantially improves the cooperation of wireless terminals, wireline terminals and Internet Protocol terminals.

DETAILED DESCRIPTION

Figure 1:
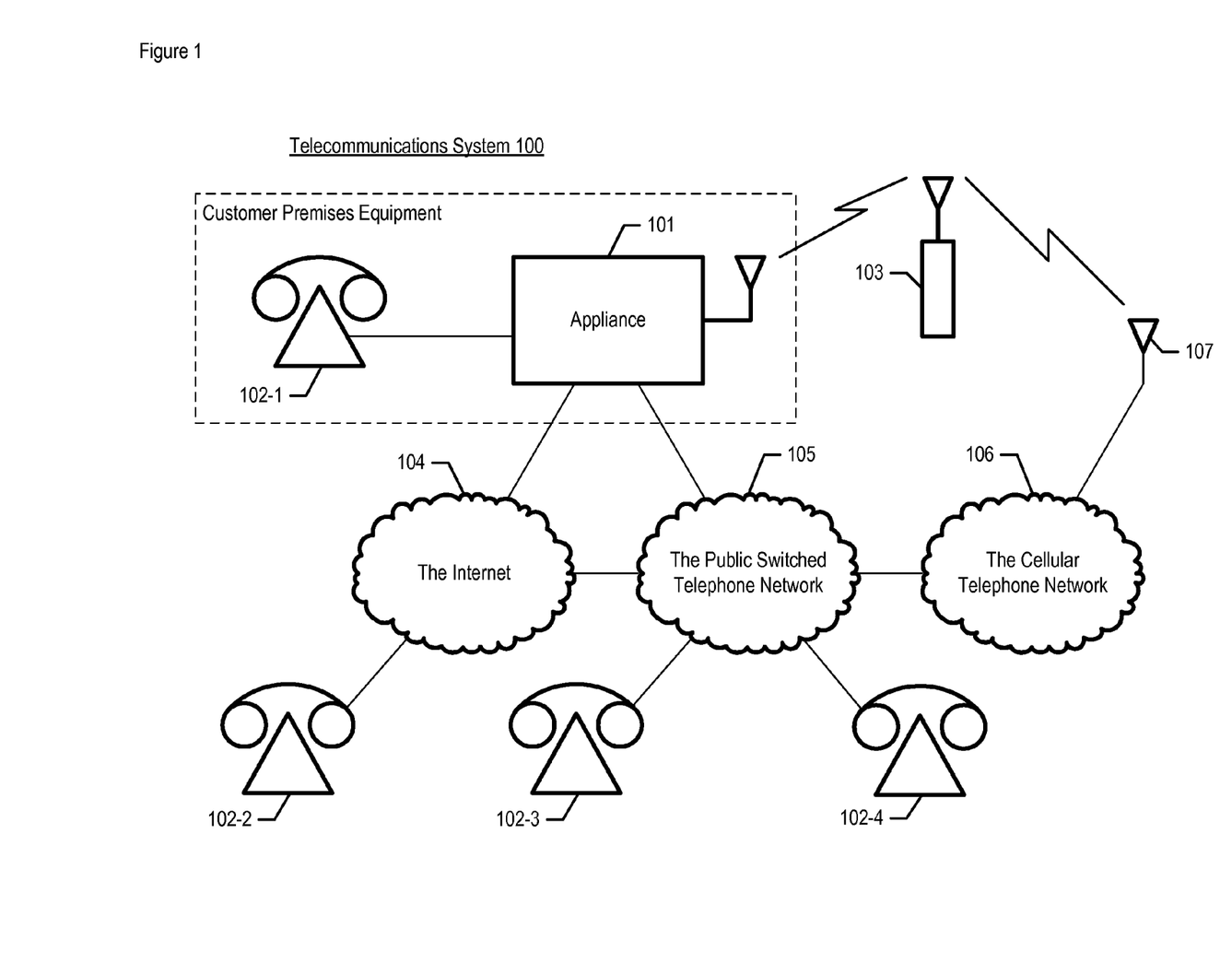
FIG. 1 depicts a schematic diagram of the salient components of telecommunications system 100 in accordance with the illustrative embodiment of the present invention.

FIG. 1 depicts a schematic diagram of the salient components of telecommunications system 100 in accordance with the illustrative embodiment of the present invention. Telecommunications system 100 comprises: appliance 101, wireline terminals 102-1 through 102-4, wireless terminal 103, the Internet 104, Public Switched Telephone Network 105, Cellular Telephone Network 106, and wireless base station 107, interrelated as shown.

Appliance 101 comprises hardware and software that connects telephone calls between wireline terminal 102-1 and wireless terminal 103, the Internet 104, and the Public Switched Telephone Network 105 in the manner described below. The purpose of appliance 101 is to enable:

Wireline terminals 102-1 through 102-4 provide a telecommunications user interface in well-known fashion. In accordance with the illustrative embodiment, wireline terminal 102-1 communicates with appliance 101 via wireline protocol Alpha. In accordance with the illustrative embodiment, wireline protocol Alpha is analog and uses signaling such as Tip and Ring, etc., but it will be clear to those skilled in the art how to make and use alternative embodiments of the present invention in which wireline protocol Alpha is digital, such as, for example, TCP/IP-based, ISDN, etc. In accordance with the illustrative embodiment, wireline terminal 102-2 communicates with the Internet 104 via wireline protocol Beta. In accordance with the illustrative embodiment, wireline protocol Beta is a TCP/IP-based protocol. In accordance with the illustrative embodiment, wireline terminals 102-3 and 102-4 communicate with the Public Switched Telephone Network 105 via wireline protocol Gamma. In accordance with the illustrative embodiment, wireline protocol Gamma is an analog protocol, such as Tip and Ring, etc., but it will be clear to those skilled in the art how to make and use alternative embodiments of the present invention in which wireline protocol Gamma a digital protocol such as, for example, ISDN, etc. It will be clear to those skilled in the art how to make and use wireline terminals 102-1 through 102-4.

Appliance 101 and wireline terminal 102-1 together compose customer premises equipment which is found in a residence or business.

Wireless terminal 103 provides a telecommunications user interface in well-known fashion and communicates with appliance 101 via wireless protocol Delta (e.g., Bluetooth, WiFi, Zigbee, etc.) and communicates with wireless base station 107 via wireless protocol Epsilon (e.g., WiMax, AMP, GSM, IS-95, IS-136, etc.). It will be clear to those skilled in the art how to make and use wireless terminal 103.

The Internet 104 is the ubiquitous digital network, and it will be clear to those skilled in the art how to extend, use, and interface with the Internet 104.

The Public Switched Telephone Network 105 is the ubiquitous telephony network, and it will be clear to those skilled in the art how to extend, use, and interface with the Public Switched Telephone Network 105.

The Cellular Telephone Network 106 is a wireless telephony network such as that owned and operated by Vodaphone, Verizon Wireless, AT&T Mobility, NTT DoCoMo, etc. The Cellular Telephone Network 106 provides telephone service to wireless terminal 103 via wireless base station 107 in well-known fashion. It will be clear to those skilled in the art how to extend, use, and interface with the Cellular Telephone Network 106.

Figure 2:
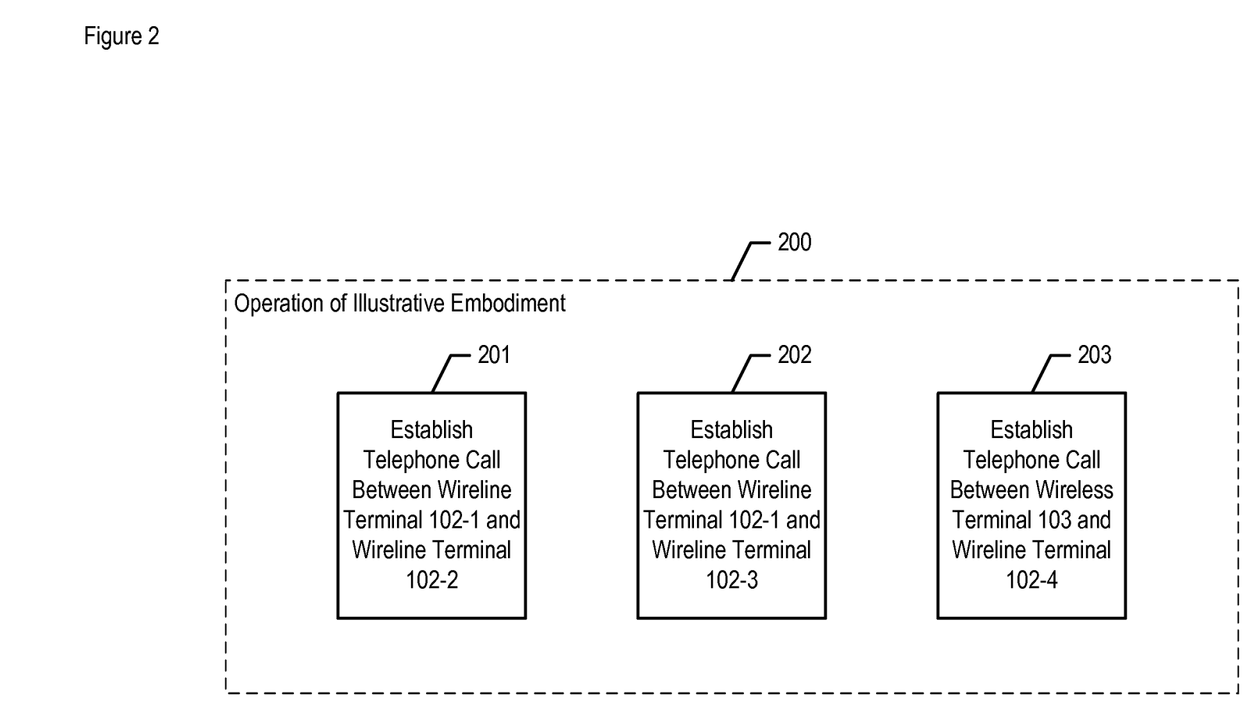
FIG. 2 depicts a flowchart of the salient tasks associated with the operation of the illustrative embodiment.

FIG. 2 depicts a flowchart of the salient tasks associated with the operation of the illustrative embodiment. In accordance with the illustrative embodiment, tasks 201-203 are not performed concurrently, but it will be clear to those skilled in the art, after reading this disclosure, how to make and use alternative embodiments of the present invention in which any two or all three of tasks 201-203 are performed concurrently.

At task 201, the illustrative embodiment establishes a telephone call between wireline terminal 102-1 and wireline terminal 102-2 through appliance 101 and the Internet 104. Task 201 is described in detail below and in the accompanying figures.

At task 202, the illustrative embodiments establishes a telephone call between wireline terminal 102-1 and wireline terminal 102-3 through appliance 101 and the Public Switched Telephone Network 105. Task 202 is described in detail below and in the accompanying figures.

Figure 3:
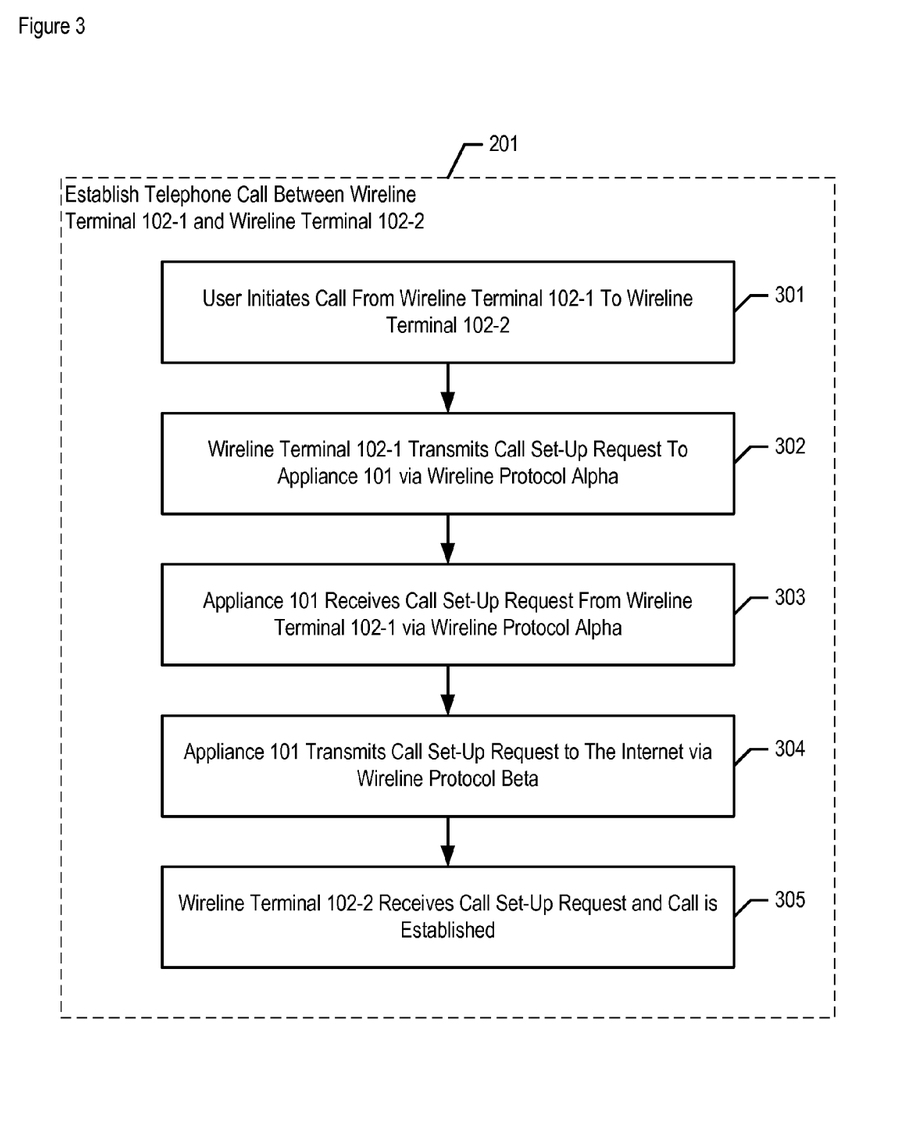
FIG. 3 depicts a flowchart of the salient tasks associated with the performance of task 201 when the telephone call is initiated by a user of wireline terminal 102-1.

FIG. 3 depicts a flowchart of the salient tasks associated with the performance of task 201 when the telephone call is initiated by a user of wireline terminal 102-1.

FIG. 3 depicts a flowchart of the salient tasks associated with the performance of task 201 when the telephone call is initiated by a user of wireline terminal 201-1.

At task 301, a user of wireline terminal 102-1 initiates a call to wireline terminal 102-2 by entering a call set-up request and the IP address of wireline terminal 102-2 into wireline terminal 102-1. In some alternative embodiments of the present invention, an alias of the IP address is entered into wireline terminal 102-1 instead of the IP address itself. It will be clear to those skilled in the art how to perform task 301.

At task 302, wireline terminal 102-1 transmits the call set-up request and the IP address of wireline terminal 102-2 to appliance 101 via wireline protocol Alpha. It will be clear to those skilled in the art how to make and use embodiments of the present invention that perform task 302.

At task 303, appliance 101 receives the call set-up request and the IP address of wireline terminal 102-2 from wireline terminal 102-1 via wireline protocol Alpha. Appliance 101 recognizes the call set-up request and IP address of wireline terminal 102-2 as an indication that the call set-up request should be routed to the Internet 104 directly, when possible, and, therefore, proceeds to task 304. It will be clear to those skilled in the art, after reading this disclosure, how to make and use embodiments of the present invention that perform task 303.

At task 304, appliance 101 transmits the call set-up request and the IP address of wireline terminal 102-2 to the Internet 104 via wireline protocol Beta. It will be clear to those skilled in the art, after reading this disclosure, how to make and use embodiments of the present invention that perform task 304.

At task 305, wireline terminal 102-2 receives the call set-up request from the Internet 104, and the call is established, in well-known fashion.

Figure 4:
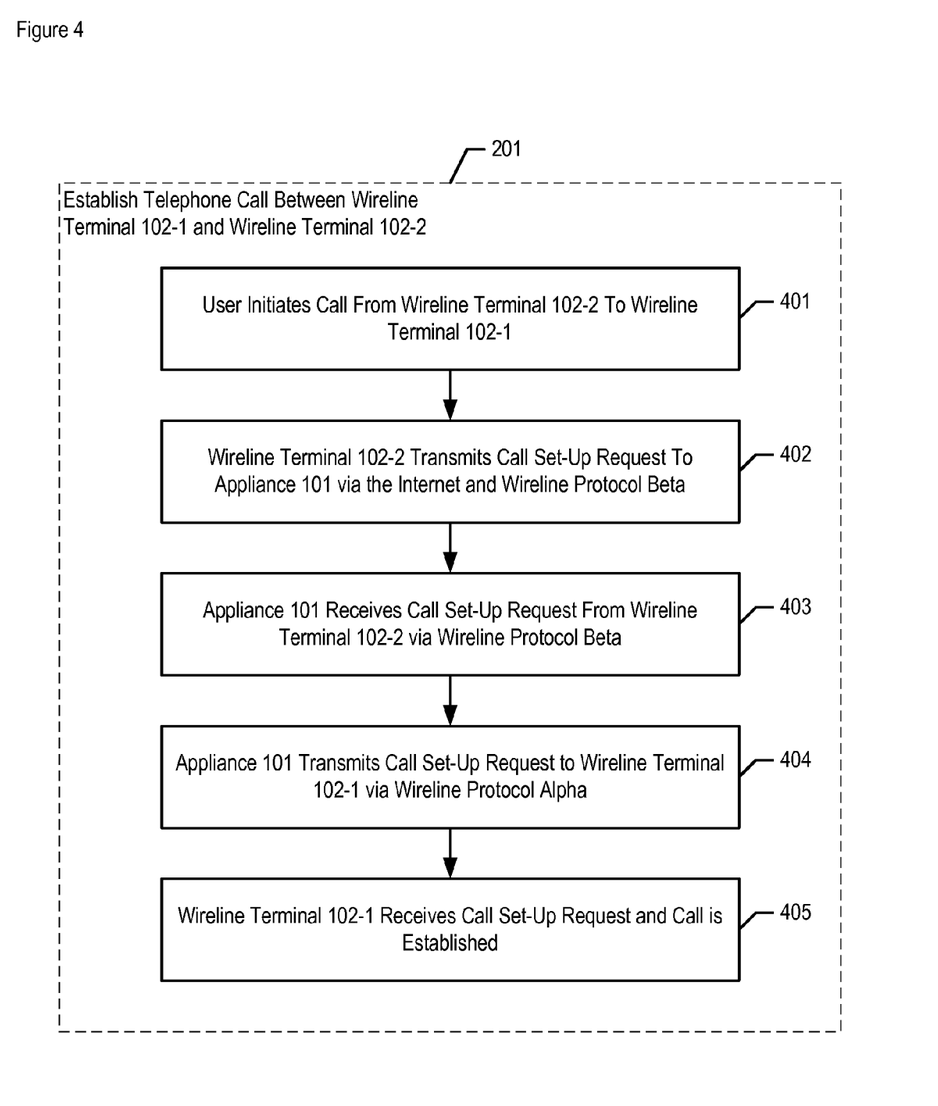
FIG. 4 depicts a flowchart of the salient tasks associated with the performance of task 201 when the telephone call is initiated by a user of wireline terminal 102-2.

FIG. 4 depicts a flowchart of the salient tasks associated with the performance of task 201 when the telephone call is initiated by a user of wireline terminal 102-2.

At task 401, a user of wireline terminal 102-2 initiates a call to wireline terminal 102-1 by entering a call set-up request and the IP address of wireline terminal 102-1 into wireline terminal 102-2.

In some alternative embodiments of the present invention, an alias of the IP address is entered into wireline terminal 102-2 instead of the IP address itself. It will be clear to those skilled in the art how to perform task 401.

At task 402, wireline terminal 102-2 transmits the call set-up request and the IP address of wireline terminal 102-1 to appliance 101 (through the Internet 104) via wireline protocol Beta. It will be clear to those skilled in the art how to perform task 402.

At task 403, appliance 101 receives the call set-up request and the IP address of wireline terminal 102-1 via wireline protocol Beta. Appliance 101 recognizes the call set-up request and IP address of wireline terminal 102-1, and, therefore, proceeds to task 404. It will be clear to those skilled in the art, after reading this disclosure, how to make and use embodiments of the present invention that perform task 403.

At task 404, appliance 101 transmits the call set-up request to wireline terminal 102-1 via wireline protocol Alpha. It will be clear to those skilled in the art how to perform task 404.

At task 404, appliance 101 transmits the call set-up request to wireline terminal 201-1 via wireline protocol Alpha. It will be clear to those skilled in the art how to perform task 404.

At task 405, wireline terminal 102-1 receives the call set-up request and the call is established, in well-known fashion.

Figure 5:
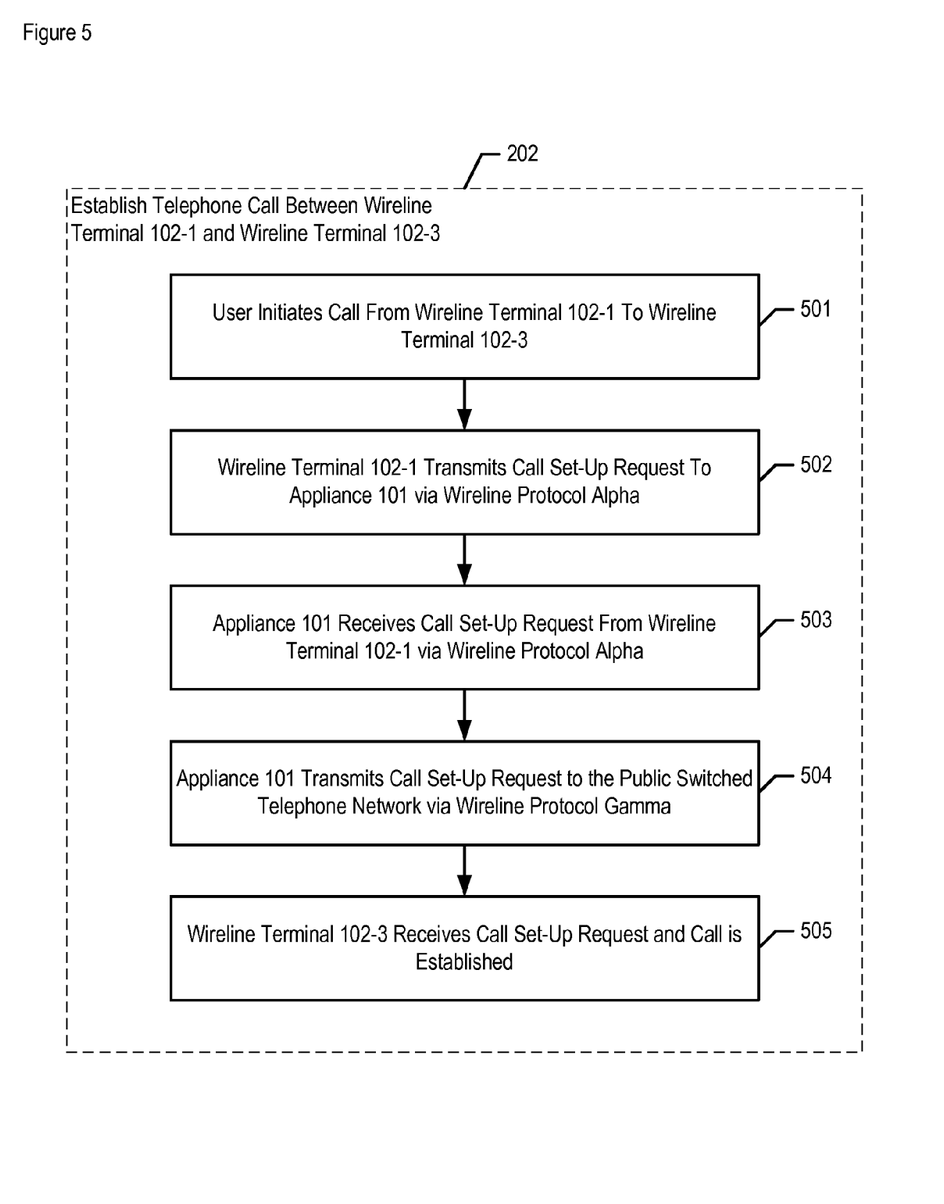
FIG. 5 depicts a flowchart of the salient tasks associated with the performance of task 202 when the telephone call is initiated by a user of wireline terminal 102-1.

FIG. 5 depicts a flowchart of the salient tasks associated with the performance of task 202 when the telephone call is initiated by a user of wireline terminal 102-1.

At task 501, a user of wireline terminal 102-1 initiates a call to wireline terminal 102-3 by entering a call set-up request and the telephone number of wireline terminal 102-3 into wireline terminal 102-1. It will be clear to those skilled in the art how to perform task 501.

At task 502, wireline terminal 102-1 transmits the call set-up request and the telephone number of wireline terminal 102-3 to appliance 101 via wireline protocol Alpha. It will be clear to those skilled in the art how to make and use embodiments of the present invention that perform task 502.

At task 503, appliance 101 receives the call set-up request and the telephone number of wireline terminal 102-3 from wireline terminal 102-1 via wireline protocol Alpha. Appliance 101 recognizes the call set-up request and telephone number of wireline terminal 102-3 as an indication that the call set-up request should be routed to the Public Switched Telephone Network 105 directly, when possible, and, therefore, proceeds to task 504. It will be clear to those skilled in the art, after reading this disclosure, how to make and use embodiments of the present invention that perform task 503.

At task 504, appliance 101 transmits the call set-up request and the telephone number of wireline terminal 102-3 to the Public Switched Telephone Network 105 via wireline protocol Gamma. At task 505, wireline terminal 102-3 receives the call set-up request and the call is established, in well-known fashion.

Figure 6:
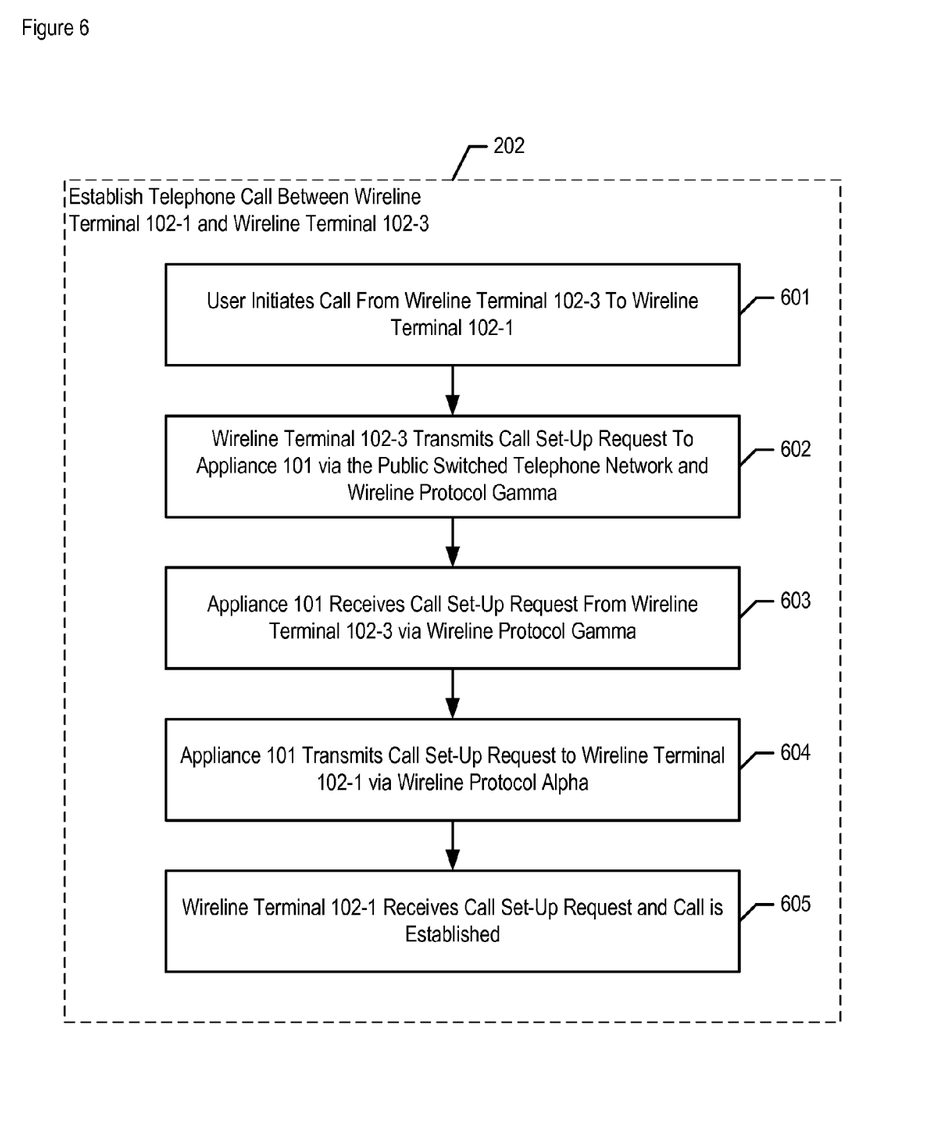
FIG. 6 depicts a flowchart of the salient tasks associated with the performance of task 202 when the telephone call is initiated by a user of wireline terminal 102-3.

FIG. 6 depicts a flowchart of the salient tasks associated with the performance of task 202 when the telephone call is initiated by a user of wireline terminal 102-3.

At task 601, a user of wireline terminal 102-3 initiates a call to wireline terminal 102-1 by entering a call set-up request and the telephone number of wireline terminal 102-1 into wireline terminal 102-3. It will be clear to those skilled in the art how to perform task 601.

At task 602, wireline terminal 102-3 transmits the call set-up request and the telephone number of wireline terminal 102-1 to appliance 101 (through the Public Switched Telephone Network 105) via wireline protocol Gamma. It will be clear to those skilled in the art how to perform task 602.

At task 603, appliance 101 receives the call set-up request and the telephone number of wireline terminal 102-1 via wireline protocol Gamma. Appliance 101 recognizes the call set-up request and telephone number of wireline terminal 102-1, and, therefore, proceeds to task 604. It will be clear to those skilled in the art, after reading this disclosure, how to make and use embodiments of the present invention that perform task 603.

At task 604, appliance 101 transmits the call set-up request to wireline terminal 102-1 via wireline protocol Alpha. It will be clear to those skilled in the art how to perform task 604.

At task 605, wireline terminal 102-1 receives the call set-up request and the call is established, in well-known fashion.

Figure 7:
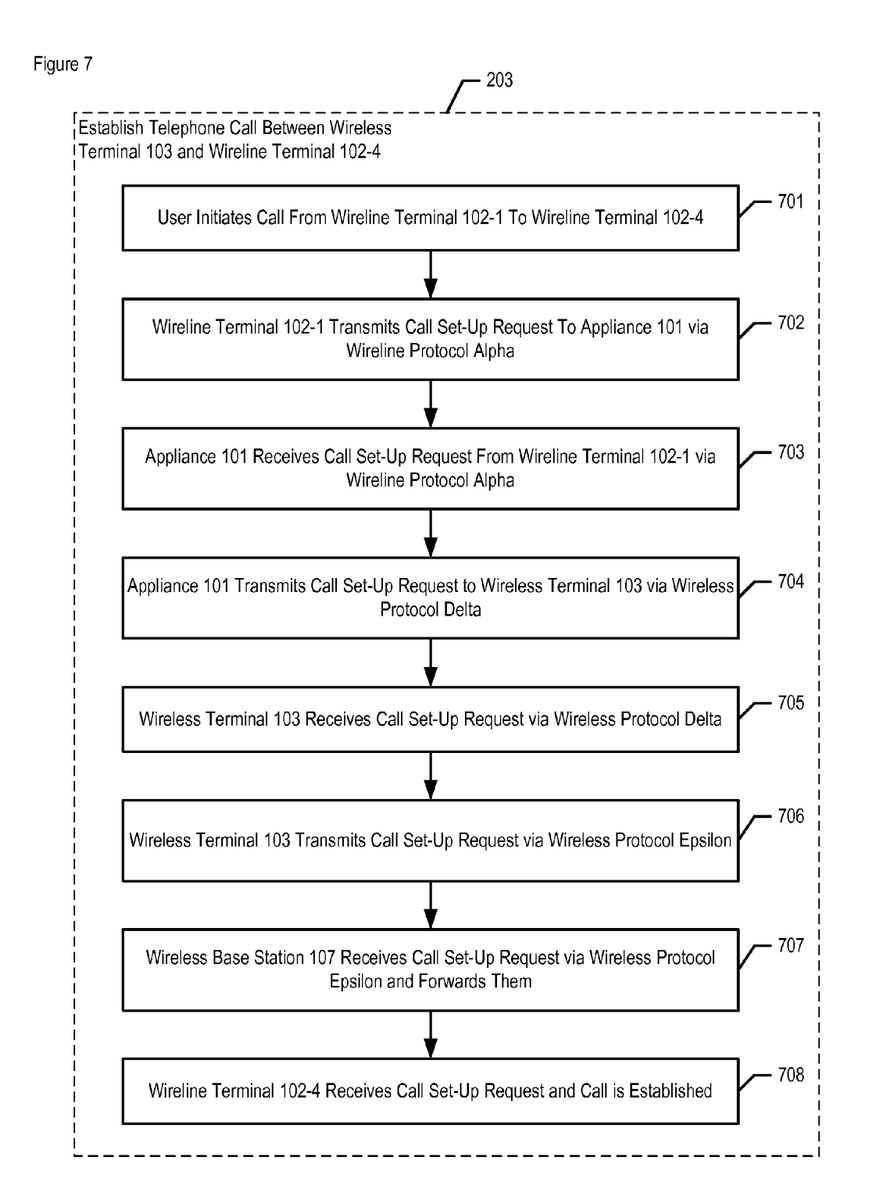
FIG. 7 depicts a flowchart of the salient tasks associated with the performance of task 203 when the telephone call is initiated by a user wireline terminal 102-1.

FIG. 7 depicts a flowchart of the salient tasks associated with the performance of task 203 when the telephone call is initiated by a user wireline terminal 102-1.

At task 701, a user of wireline terminal 102-1 initiates a call to wireline terminal 102-4 by entering a call set-up request and the telephone number of wireline terminal 102-4 into wireline terminal 102-1. It will be clear to those skilled in the art how to perform task 701.

At task 702, wireline terminal 102-1 transmits the call set-up request and the telephone number of wireline terminal 102-4 to appliance 101 via wireline protocol Alpha. It will be clear to those skilled in the art how to make and use embodiments of the present invention that perform task 702.

At task 703, appliance 101 receives the call set-up request and the telephone number of wireline terminal 102-4 from wireline terminal 102-1 via wireline protocol Alpha. Appliance 101 recognizes the call set-up request and telephone number of wireline terminal 102-4 as an indication that the call set-up request should be routed through wireless terminal 103, when possible, and, therefore, proceeds to task 704. It will be clear to those skilled in the art, after reading this disclosure, how to make and use embodiments of the present invention that perform task 703.

At task 704, appliance 101 transmits the call set-up request and the telephone number of wireline terminal 102-4 to wireless terminal 103 via wireless protocol Delta. It will be clear to those skilled in the art, after reading this disclosure, how to make and use embodiments of the present invention that perform task 704.

At task 705, wireless terminal 103 receives the call set-up request and the telephone number of wireline terminal 102-4 via wireless protocol Delta.

At task 706, wireless terminal 103 transmits (relays) the call set-up request and the telephone number of wireline terminal 102-4 to wireless base station 107 via wireless protocol Epsilon, in well-known fashion.

At task 707, wireless base station 107 receives the call set-up request and the telephone number of wireline terminal 102-4 and forwards them to wireline terminal 102-4 via the Cellular Telephone Network 106 and Public Switched Telephone Network 105, in well-known fashion.

At task 708, wireline terminal 102-4 receives the call set-up request and the call is established, in well-known fashion.

Figure 8:
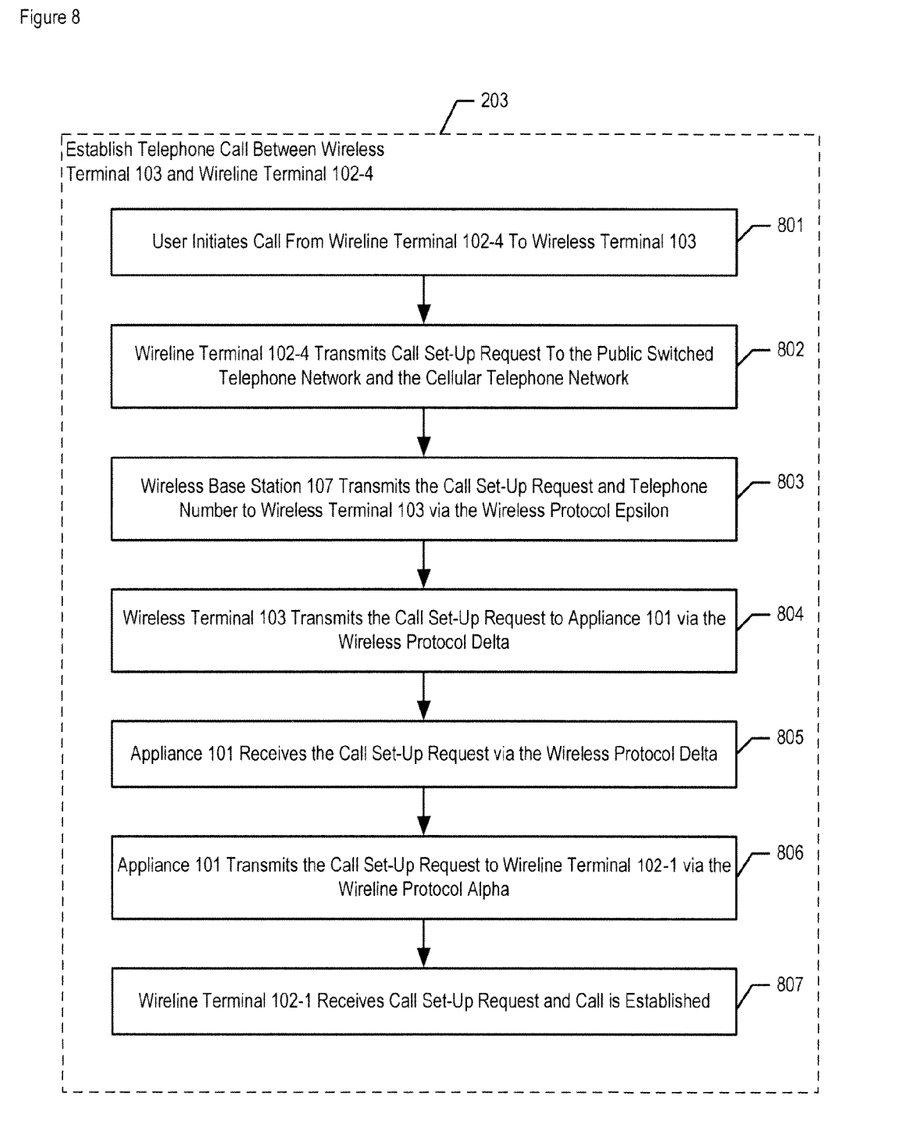
FIG. 8 depicts a flowchart of the salient tasks associated with the performance of task 203 when the telephone call is initiated by a user wireline terminal 102-4.

FIG. 8 depicts a flowchart of the salient tasks associated with the performance of task 203 when the telephone call is initiated by a user wireline terminal 102-4.

At task 801, a user of wireline terminal 102-4 initiates a call to wireline terminal 102-1 by entering a call set-up request and the telephone number of wireless terminal 103 into wireline terminal 102-4. It will be clear to those skilled in the art how to perform task 801.

At task 802, wireline terminal 102-4 transmits the call set-up request and the telephone number of wireless terminal 103 to Public Switched Telephone Network 105, which forwards the call set-up request and the telephone number to Cellular Telephone Network 106. As part of task 802, Cellular Telephone Network 106 forwards the call set-up request and the telephone number to wireless base station 107. It will be clear to those skilled in the art how to make and use embodiments of the present invention that perform task 802.

At task 803, wireless base station 107 transmits the call set-up request and telephone number to wireless terminal 103 via wireless protocol Epsilon, in well-known fashion.

At task 804, wireless terminal 103 transmits the call set-up request to appliance 101 via wireless protocol Delta. It will be clear to those skilled in the art, after reading this disclosure, how to make and use embodiments of the present invention that perform task 804.

At task 805, appliance 101 receives the call set-up request via wireless protocol Delta, in well-known fashion.

At task 806, appliance 101 transmits the call set-up request to wireline terminal 102-1 via wireline protocol Alpha, in well-known fashion.

At task 807, wireline terminal 102-1 receives the call set-up request and the call is established, in well-known fashion. This enables the user of wireless terminal 103 to answer and conduct the call using wireline terminal 102-4.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving a first call set-up request at the appliance from a wireline terminal via wireline protocol Alpha;
   transmitting the first call set-up request from the appliance to a wireless terminal via wireless protocol Delta;
   receiving the first call set-up request at the wireless terminal via wireless protocol Delta;
   transmitting the first call set-up request from the wireless terminal via wireless protocol Epsilon;
   receiving a second call set-up request at the appliance from the wireline terminal via wireline protocol Alpha; and
   transmitting the second call set-up request from the appliance to the Public Switched Telephone Network via wireline protocol Gamma.

2. The method of claim 1 further comprising:
   receiving a third call set-up request at the appliance from the wireline terminal via wireline protocol Alpha; and
   transmitting the third call set-up request from the appliance to the Internet via wireline protocol Beta.

3. The method of claim 1 further comprising:
   receiving a third call set-up request at a wireless terminal via wireless protocol Epsilon;
   transmitting the third call set-up request from the wireless terminal to an appliance via wireless protocol Delta;
   receiving the third call set-up request at the appliance via wireless protocol Delta; and
   transmitting the third call set-up request to a wireline terminal via wireline protocol Alpha.

4. The method of claim 1 further comprising:
   receiving a third call set-up request at the appliance from the Public Switched Telephone Network via wireline protocol Gamma; and
   transmitting the third call set-up request to the wireline terminal via wireline protocol Alpha.

5. The method of claim 1 further comprising:
   receiving a third call set-up request at the appliance from the Internet via wireline protocol Beta; and
   transmitting the third call set-up request to the wireline terminal via wireline protocol Alpha.

6. A method comprising:
receiving a first call set-up request at the appliance from a wireline terminal via wireline protocol Alpha;
transmitting the first call set-up request from the appliance to the wireless terminal via wireless protocol Delta;
receiving the first call set-up request at the wireless terminal via wireless protocol Delta;
transmitting the first call set-up request from the wireless terminal via wireless protocol Epsilon;
receiving a second call set-up request at the appliance from the wireline terminal via wireline protocol Alpha; and
transmitting the second call set-up request from the appliance to the Internet via wireline protocol Beta.

7. The method of claim 1 further comprising:
receiving a third call set-up request at the appliance from the wireline terminal via wireline protocol Alpha; and
transmitting the third call set-up request from the appliance to the Public Switched Telephone Network via wireline protocol Gamma.

8. The method of claim 1 further comprising:
receiving a third call set-up request at a wireless terminal via wireless protocol Epsilon;
transmitting the third call set-up request from the wireless terminal to an appliance via wireless protocol Delta;
receiving the third call set-up request at the appliance via wireless protocol Delta; and
transmitting the third call set-up request to a wireline terminal via wireline protocol Alpha.

9. The method of claim 1 further comprising:
receiving a third call set-up request at the appliance from the Public Switched Telephone Network via wireline protocol Gamma; and
transmitting the third call set-up request to the wireline terminal via wireline protocol Alpha.

10. The method of claim 1 further comprising:
receiving a third call set-up request at the appliance from the Internet via wireline protocol Beta; and
transmitting the third call set-up request to the wireline terminal via wireline protocol Alpha.

11. A method comprising:
receiving a first call set-up request at a wireless terminal via wireless protocol Epsilon;
transmitting the first call set-up request from the wireless terminal to an appliance via wireless protocol Delta;
receiving the first call set-up request at the appliance via wireless protocol Delta;
transmitting the first call set-up request to a wireline terminal via wireline protocol Alpha;
receiving a second call set-up request at the appliance from the wireline terminal via wireline protocol Alpha; and
transmitting the second call set-up request from the appliance to the Public Switched Telephone Network via wireline protocol Gamma.

12. The method of claim 11 further comprising:
receiving a third call set-up request at the appliance from the wireline terminal via wireline protocol Alpha; and
transmitting the third call set-up request from the appliance to the Internet via wireline protocol Beta.

13. The method of claim 11 further comprising:
receiving a third call set-up request at the appliance from the wireline terminal via wireline protocol Alpha;
transmitting the third call set-up request from the appliance to the wireless terminal via wireless protocol Delta;
receiving the third call set-up request at the wireless terminal via wireless protocol Delta; and
transmitting the third call set-up request from the wireless terminal via wireless protocol Epsilon.

14. The method of claim 11 further comprising:
receiving a third call set-up request at the appliance from the Public Switched Telephone Network via wireline protocol Gamma; and
transmitting the third call set-up request to the wireline terminal via wireline protocol Alpha.

15. The method of claim 11 further comprising:
receiving a third call set-up request at the appliance from the Internet via wireline protocol Beta; and
transmitting the third call set-up request to the wireline terminal via wireline protocol Alpha.

16. A method comprising:
receiving a first call set-up request at a wireless terminal via wireless protocol Epsilon;
transmitting the first call set-up request from the wireless terminal to an appliance via wireless protocol Delta;
receiving the first call set-up request at the appliance via wireless protocol Delta;
transmitting the first call set-up request to a wireline terminal via wireline protocol Alpha;
receiving a second call set-up request at the appliance from the wireline terminal via wireline protocol Alpha; and
transmitting the second call set-up request from the appliance to the Internet via wireline protocol Beta.

17. The method of claim 16 further comprising:
receiving a third call set-up request at the appliance from the wireline terminal via wireline protocol Alpha; and
transmitting the third call set-up request from the appliance to the Public Switched Telephone Network via wireline protocol Gamma.

18. The method of claim 16 further comprising:
receiving a third call set-up request at the appliance from the wireline terminal via wireline protocol Alpha;
transmitting the third call set-up request from the appliance to the wireless terminal via wireless protocol Delta;
receiving the third call set-up request at the wireless terminal via wireless protocol Delta; and
transmitting the third call set-up request from the wireless terminal via wireless protocol Epsilon.

19. The method of claim 16 further comprising:
receiving a third call set-up request at the appliance from the Public Switched Telephone Network via wireline protocol Gamma; and
transmitting the third call set-up request to the wireline terminal via wireline protocol Alpha.

20. The method of claim 16 further comprising:
receiving a third call set-up request at the appliance from the Internet via wireline protocol Beta; and
transmitting the third call set-up request to the wireline terminal via wireline protocol Alpha.

\* \* \* \* \*